Jan. 21, 1936. W. LARKIN Re. 19,827

KNITTING MACHINE

Original Filed April 6, 1927 2 Sheets-Sheet 1

Inventor
Walter Larkin
by his Attorneys
Howson & Howson

Jan. 21, 1936. W. LARKIN Re. 19,827

KNITTING MACHINE

Original Filed April 6, 1927 2 Sheets-Sheet 2

Inventor
Walter Larkin
by his Attorneys
Howson & Howson

Reissued Jan. 21, 1936 Re. 19,827

UNITED STATES PATENT OFFICE 19,827

KNITTING MACHINE

Walter Larkin, Norristown, Pa., assignor to Fidelity Machine Company, Wilmington, Del., a corporation of Delaware Original application April 6, 1927, Serial No. 181,507. Divided and application October 2, 1930, Serial No. 485,977. Patent No. 1,887,413, dated November 8, 1932. This application for reissue November 6, 1934, Serial No. 751,764

16 Claims. (Cl. 66—25)

This invention relates to circular rib knitting machines, and particularly to actuating means for the welt mechanism of the machine.

The present application constitutes a division of my co-pending application, Serial No. 181,507, filed April 6, 1927, Patent No. 1,841,249.

The construction and operation of the mechanism forming the subject matter of the present application will be fully disclosed hereinafter, reference being had to the accompanying drawings, of which:

Figure 1:
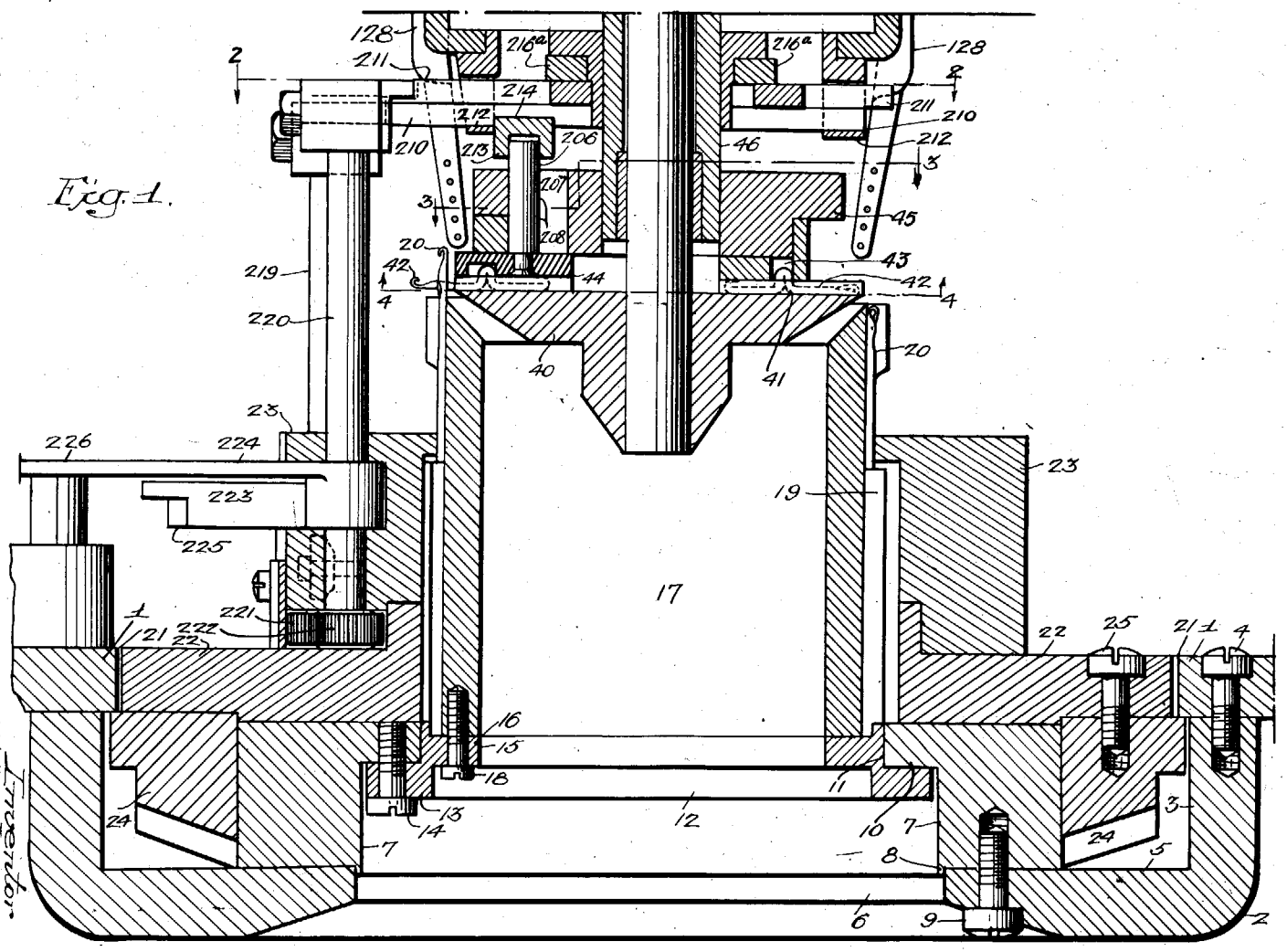
Fig. 1 is a sectional elevation of sufficient of a rib knitting machine to illustrate my invention as applied thereto.

Referring to the drawings:

The rib knitting machine comprises a bed plate 1, on the underside of which is suitably mounted a hollow annular cylinder supporting member 2. The cylinder supporting member 2 comprises a substantially circular vertical wall 3, which is secured to the bed plate 1 by means of screws 4, and a horizontal base 5, which is provided with a circular opening 6. A base ring 7 is mounted on the horizontal base 5 within the cylinder supporting member 2, and has a depending flange 8 which lies within the circular opening 6, functioning to maintain the said ring in axial alignment with the member 2. The base ring 7 is secured to the base 5 by means of screws 9, and is provided with an inwardly projecting circular flange 10, having a circular opening 11 formed therein, which axially aligns with the opening 6 of the member 2. A cylinder supporting ring 12 fits within the opening 11, in the base ring 7, and is provided with an outwardly projecting flange 13 which underlies the flange 10 of the base ring 7 and is secured thereto by screws 14. The cylinder ring 12 is also provided with a second inwardly projecting flange 15 in the top of which is formed a circular depression 16. The base of the needle cylinder 17 fits within the depression 16, and is secured to the cylinder ring 12 by means of screws 18. The cylinder 17, as usual, is hollow and is provided on its outer face with vertical grooves 19 for the reception of the cylinder knitting needles 20. Thus it will be seen that through the mechanism just described the cylinder 17 is non-rotatably supported on the bed plate 1 of the machine.

The bed plate 1 is provided with a circular opening 21 within which is rotatably mounted a cylinder cam plate 22. The usual form of split cylinder cam ring 23 is attached to the cam plate 22, in the usual manner, and is adapted, with the said cam plate 22, to be rotated and in axial alignment with the cylinder 17, for the purpose of operating the cylinder needles 20. The cam plate 22 is vertically and rotatably supported by and on the base ring 7, and is circularly guided by a gear ring 24 which surrounds the base ring 7 and is secured to the cylinder cam plate 22 by means of screws 25. The gear ring 24 lies within the hollow member 2, and projects under the bed plate 1 around the opening 21 formed therein.

The gear ring 24 is operatively attached to the cylinder cam plate 22 by means of screws 25. Thus the cylinder cam plate is rotatably mounted within the opening 21 of the bed plate 1, but is held against vertical axial movement by the gear ring 24 underlying said bed plate.

The machine is provided with a needle dial 40 secured to the lower end of and non-rotatably supported by a stationary dial post 38.

The dial plate 40 is provided with the usual radially disposed grooves 41 for the reception of the dial needles 42, each of which is adapted to be projected radially between each adjacent pair of cylinder needles 20, in the usual manner.

A dial cam plate 45 is rotatably mounted above the dial plate 40, and is provided with the usual dial cams 43 and dial needle switch 44 for the operation of the dial needles 42. The dial cam plate 45 is secured to the lower end of tubular shaft 46 which is axially aligned with and revolves around the stationary dial post 38.

The dial cam 45 and cylinder cam ring 23 are adapted to be rotated in unison by means forming no part of the present invention per se.

Synchronous rotation of the cylinder cam plate 22, which carries the cam ring 23, and the dial cam plate 45, with its associated dial needle cams, will operate the dial and cylinder needles in the usual manner to form circular knit ribbed foundation fabric when a thread is properly fed thereto.

In view of the fact that the particular class of goods for which this machine is adapted is stocking tops, I provide the machine with welt-forming mechanism which comprises means for operating the needle switch 44 on the dial cam plate 45. As there is no invention in the welt itself, specific reference thereto will be omitted, the description being limited to the apparatus that controls the dial needle switch which, together with the usual welt-forming operation of the cylinder needles, effects the formation of a conventional form of welt.

Figure 3:
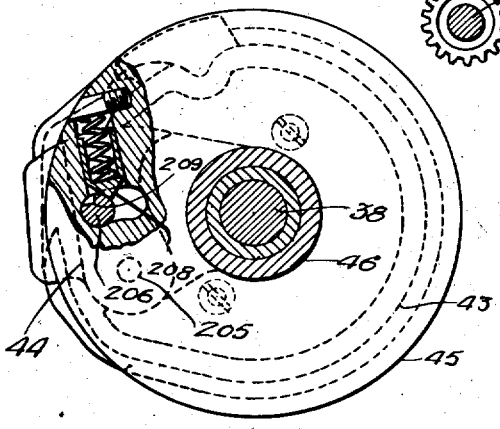
Fig. 3 is a plan view, partly in section, of the welt-forming mechanism, the section being taken on the line 3—3, Fig. 1.
Figure 4:
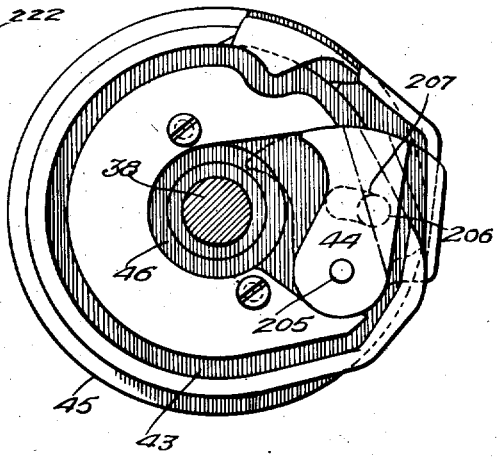
Fig. 4 is a sectional view taken on the line 4—4, Fig. 1, and showing the welt-forming mechanism in inverted plan.

The dial needle switch 44 is pivoted at 205 to the underside of the dial cam plate 45 and is provided with a post 206 which projects through a slot 207 formed in the cam plate 45. The switch is movable to three different positions, in one of which the post 206 occupies a position at one end of the slot 207, in another the post occupies a position midway between the extreme ends of the slot and in the third position the post 206 occupies a position at the extreme opposite end of the slot 207. A spring-pressed pointed plunger 208 holds the post in any one of the three positions to which it may be moved, bearing against the opposite sides of the post when in the extreme positions and the point of the plunger entering a depression 209 in the post 206 when it is in its mid position, as clearly shown in Fig. 3.

The dial switch 44 is adapted to be operated by means of a pair of superposed operating bars 210, 211 which are slidably mounted in a stationary guide member 212. The slide bar 210 carries a grooved segmental member 213 into the arcuate groove 214 of which the upper end of the post 206 is adapted to pass when the dial cam plate 45 rotates. Each of the slide bars 210 and 211 is provided with a pin 215, each of which is adapted to enter an aperture 216 formed in each side of a ring 216a which pivots around the tubular shaft 46, see Fig. 2, so that when one of the slide bars is moved in one direction the other slide bar will be moved in the opposite direction and the switch post 206 being at such time within the groove 214 in the member 213, which is attached to one of the slide bars, will be moved to carry the switch 44 in one of its positions, as the case may be.

The slide bars 210 and 211 are each engaged at one of their ends by a lever 217 and 218 respectively, which are respectively secured to the upper ends of oscillating shafts 219 and 220, pivotally mounted in and projecting vertically from the cylinder cam ring 23. These two shafts are operatively connected at their opposite ends by gears 221 and 222 and are each provided with a second arm 223 and 224 adjacent the said gears. The lever 223 is provided with an undercut 225 which produces in effect a lever of two different lengths. The levers 223, 224 and the undercut 225 are adapted to be engaged by the usual form of bob-disc 226 which is vertically slidably mounted in the bed plate 1 of the machine adjacent the periphery of the cylinder cam plate 22 and permitted to rotate freely about its own axis.

The bob-disc 226 is adapted to be moved to various elevations, by mechanism forming no part of the present invention per se, for the purpose of engaging the levers 223, 224, 225, to effect the positioning of the dial needle switch 44 correctly and at the proper times in the various positions necessary to guide the dial needles in the way to form the regular welt edge and dividing course commonly produced on circular rib knitting machines.

Figure 2:
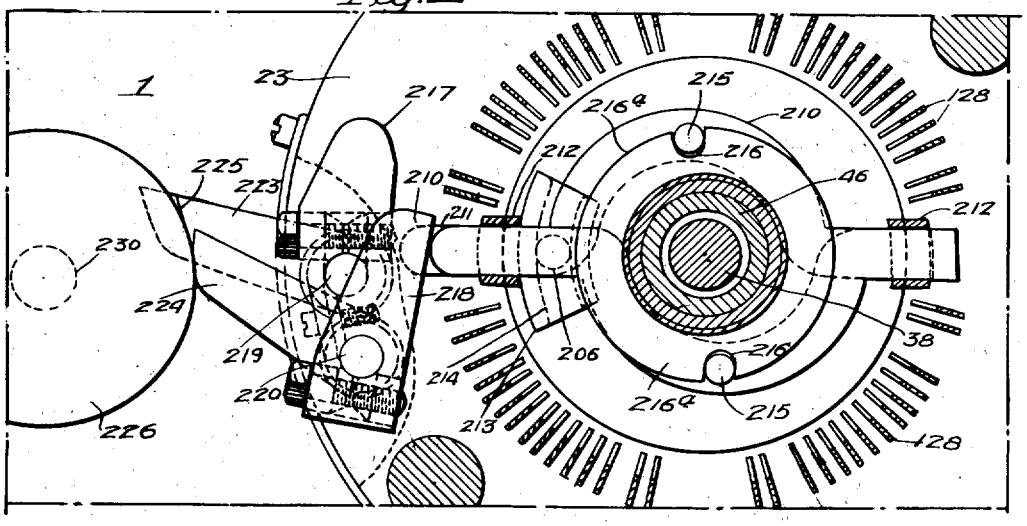
Fig. 2 is a sectional plan view taken on the line 2—2, Fig. 1.
Figure 5:
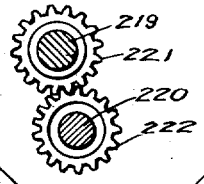
Fig. 5 illustrates a detail of the mechanism.

When the mechanism above described is used with a rib knitting machine equipped with needle-wrapping fingers such as disclosed in the parent Patent No. 1,841,249, dated January 12, 1932, of which Patent No. 1,847,413, dated November 8, 1932, is a division, the ends of the stationary operating bars 210, 211, which are engaged by the rotary levers 217 and 218 respectively project through the stationary circle of fingers 128 which surrounds the rotary dial cam plate 45, as shown in Figs. 1 and 2, whereby, at such time as the switch post 206 is passing through the groove 214 of the segmental member 213, which is carried by the slide bar 210, the outer ends of the slide bars 210 and 211 register with the levers 217 and 218 respectively so that any relative oscillation of these levers, occurring at such time, is transmitted from the outside to the inside of the stationary circle of fingers to the rotating switch post 206, by the rotating levers 217, 218 through the non-rotating slide bars 210, 211.

I claim:

1. In a circular rib knitting machine, the combination, with the dial cam of said machine which includes a needle switch, of an actuating element for said switch normally disconnected from said switch, means for operatively interlocking said switch and said actuating element throughout a predetermined angle of a cycle of continuous relative rotation between the said cam and the said switch-actuating element, and means for operating said actuating element to operate the switch relative to the cam during the said period of interlock between the switch and the actuating element therefor.

2. In a circular rib knitting machine, the combination, with the rotary dial cam of said machine which includes a needle switch, of a non-rotatable actuating element for said switch normally disconnected from said switch, means for operatively interlocking said switch and said actuating element throughout a predetermined angle of a cycle of continuous relative rotation between the said cam and the said switch-actuating element, and means rotatable in unison with said dial cam and adapted to engage said actuating element during the said period of interlock for operating said actuating element to operate the switch relative to the cam during the said period of interlock between the switch and the actuating element therefor.

3. In a circular rib knitting machine, the combination with the rotary cylinder cam ring and the rotary dial cam of said machine, said dial cam including a needle switch, of a non-rotatable actuating element for said switch normally disconnected from said switch, means for operatively interlocking said switch and said actuating element throughout a predetermined angle of relative rotation between the dial cam and the switch actuating element, means carried by the said rotary cylinder cam ring adapted to engage said actuating element for operation of said switch during the said period of interlock between the switch and its actuating element, and means disposed in a relatively fixed position with respect to said rotary cylinder cam ring and rotary dial cam adapted to engage the last said means for effecting operation of the switch-actuating element during said period of interlock.

4. In a circular rib knitting machine, the combination with the dial cam of said machine which includes a needle switch element, of an actuating element for and normally disconnected from said switch element, a projection on one of said elements, an open jaw on the other of said elements adapted to receive and interlock with the said projection throughout a predetermined angle of a cycle of continuous rotation of one of said elements relative to the other of said elements about an axis common to both of said elements, and means for operating said actuating element to effect operation of said switch element during said period of interlock between the projection and the open jaw.

5. In a circular rib knitting machine, the combination with the dial cam of said machine which includes a needle switch element, of an actuating element for and normally disconnected from said switch element, a projection on one of said elements, an open jaw on the other of said elements adapted to receive and interlock with the said projection throughout a predetermined angle of a cycle of rotation of one of said elements relative to the other of said elements about an axis common to both of said elements, a reversing member for and operatively connected to said actuating element, and means adapted to selectively engage said actuating element or said reversing member to move said switch into predetermined relation to said cam during said period of interlock between the projection and the open jaw.

6. In a circular rib knitting machine, the combination with the dial cam of said machine which includes a needle switch element, of an actuating element for and normally disconnected from said switch element, a projection on one of said elements, an open jaw on the other of said elements adapted to receive the said projection throughout a predetermined angle of a cycle of rotation of one of said elements relative to the other of said elements about an axis common to both of said elements, a reversing member for said actuating member movable substantially parallel to said actuating member, a lever element pivoted with respect to said cam at a point intermediate the actuating element and its reversing member and operatively connected at the opposite sides of its fulcrum to said actuating element and said reversing member respectively, and means adapted to selectively engage said actuating element or said reversing member to move said switch into predetermined relation to said cam during said period of interconnection.

7. In a circular rib knitting machine, the combination with the dial cam of said machine which includes a needle switch element, of an actuating element for and normally disconnected from said switch element, a projection on one of said elements, an open jaw on the other of said elements adapted to receive the said projection throughout a predetermined angle of a cycle of rotation of one of said elements relative to the other of said elements about an axis common to both of said elements, a reversing member for said actuating member movable substantially parallel to said actuating member, a lever element mounted for pivotal movement about said axis and operatively connected at opposite sides of said axis to said actuating element and said reversing member respectively, and means adapted to selectively engage said actuating element or said reversing member to move said switch element into predetermined relation to said cam during said period of interconnection.

8. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, and stationary means for actuating the swing cam.

9. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, and means intersecting the wrap finger circle for operating said swing cam.

10. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, means intersecting the wrap finger circle for operating said swing cam, and means carried by the rotary cylinder cam ring outside the wrap finger circle for controlling said swing cam-actuating means.

11. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, means intersecting the wrap finger circle for operating said swing cam, means carried by the rotary cylinder cam ring outside the wrap finger circle for controlling said swing cam-actuating means, and stationary means for manipulating said controlling means to control the actuation of the swing cam.

12. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, and a slide within and extending beyond the wrap finger circle for actuating the swing cam.

13. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, a slide within and extending beyond the wrap finger circle, and a pin on the swing cam operable in a channel formed in the slide for actuating the swing cam.

14. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, a slide within and extending beyond the wrap finger circle, a pin on the swing cam operable in a channel formed in the slide for actuating the swing cam, and a dog on said cam ring operable outside the wrapping finger circle for engagement with the extending portion of the slide to adjust said slide into a predetermined position for actuating the swing cam.

15. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, a plurality of slides within the wrap finger circle for actuating said swing cam with an end portion of each slide extending beyond said wrap finger circle, and dogs on the cam ring respectively engageable with the projecting ends of said slides for regulating the relative swing cam-controlling positions of said slides.

16. In a circular rib knitting machine comprising a stationary circle of cylinder needles, a rotary cylinder cam ring operating said cylinder needles, stationary wrap fingers circularly arranged above the cylinder needles in predetermined lateral relation to each other according to a predetermined design, stationary dial needles arranged in a plane at right angles to the axis of the cylinder needle and wrap finger circles with portions of said dial needles extending inside said circles, a rotary dial cap within the wrap finger circle, a swing cam carried by said cap for varying the stitch-forming actuations of the dial needles, a plurality of slides within the wrap finger circle for actuating said swing cam with an end portion of each slide extending beyond said wrap finger circle, dogs on the cam ring respectively engageable with the projecting ends of said slides for regulating the relative swing cam-controlling positions of said slides, and a stationary bob disc controlling the actuations of said dogs.

WALTER LARKIN.